United States Patent [19]

Aleksander et al.

[11] Patent Number: 4,490,847
[45] Date of Patent: Dec. 25, 1984

[54] RECOGNITION APPARATUS

[75] Inventors: Igor Aleksander, London; Thomas J. Stonham, Stoke Talmage; Bruce A. Wilkie, Pinner, all of England

[73] Assignee: National Research Development Corporation, London, England

[21] Appl. No.: 442,415

[22] Filed: Nov. 17, 1982

[30] Foreign Application Priority Data

Nov. 27, 1981 [GB] United Kingdom ............... 8135939

[51] Int. Cl.³ ............................................. G06K 9/00
[52] U.S. Cl. ....................................... 382/10; 382/14; 382/36
[58] Field of Search .................. 382/10, 14, 15, 27, 382/33, 36; 381/41–43; 343/5 MM

[56] References Cited

U.S. PATENT DOCUMENTS 3,581,281  5/1971  Martin et al. ......................... 382/14
3,609,686  9/1971  Savory et al. ......................... 382/14

OTHER PUBLICATIONS

Aleksander and Stonham, "Guide to Pattern Rec. Using Random-Access Memories", *Computers and Digital Tech.*, vol. 2, No. 1, Feb. 1979, pp. 29–39.
Fairhurst and Kormilo, "Some Economic Considerations in the Design of an Optimal N-Tuple Pattern Classifier", *Digital Processes*, 3 (1977), pp. 321–329.
Fairhurst and Stonham, "A Class. System for Alpha-Numeric Characters Based on Learning Network Techniques", *Digital Processes*, 2 (1976), pp. 321–339.

*Primary Examiner*—Leo H. Boudreau
*Attorney, Agent, or Firm*—Cushman, Darby & Cushman

[57] ABSTRACT

In image recognition systems of the type employing a frame store having groups (N-tuples) of locations mapped to storage forming discriminators trained, or capable of being trained, to respond to different images, a problem arises in that either a large number of separate discriminator stores are required or recognition times are long. In the present invention the discriminator storage comprises p discrete stores having address terminals divided into two groups: one group directly mapped to respective portions of the frame store and the other group being connected in parallel and used to count through a number of N-tuple groups (each of size p) and/or a number of discriminators. Such a storage arrangement allows many different combinations of number of discriminator stores and recognition time, making possible an optimum combination for a particular application.

10 Claims, 3 Drawing Figures

RECOGNITION APPARATUS

The present invention relates to an image recognition apparatus. An object or pattern to be recognised may for example be viewed by an optical system in forming the image. The apparatus usually requires two phases for operation: firstly a learning phase in which a plurality of patterns relating to those which are to be recognised are presented for example to the optical system and secondly a recognition phase in which patterns to be recognised are presented. However, in apparatus dedicated to a particular application, the learning phase may be omitted when the apparatus can be built to incorporate the results of the learning phase.

Pattern recognition systems employing random access memories (RAMs) in which the memory is divided into sections each requiring N address lines are known, these sections being known in this specification and claims as N-tuples. Groups of N-tuples are called discriminators and in general there is one discriminator for each class of pattern to be recognised. For example if there are three patterns to be recognised then there will be three discriminators each containing a number of N-tuples and in general there is a value of N for which the capability of the apparatus to distinguish between patterns is highest.

The image to be recognised is held in a buffer store and each element in the store is connected to an address line of one RAM in each discriminator.

These concepts are described in the paper "Guide to pattern recognition using random-access memories" by I. Aleksander and T. J. Stonham, in Computers and Digital Techniques, Feb. 1979, Vol. 2, No. 1.

According to the present invention there is provided apparatus for recognising images, comprising an input store having a plurality of storage locations allowing data representative of elements of an image which is to be recognised to be stored at locations related to the positions of the elements, a plurality of output stores each having a number of address terminals which allow every storage location in that store to be addressed, the locations of the output store either containing, or being capable of containing, data related to images which are to be recognised, the address terminals being divided into at least a lower significance group and a higher significance group, each group of terminals containing at least one terminal, mapping means with input connected to the input store and a plurality of output terminals divided into groups with each group corresponding to a respective output store and at least one of the terminals of that group connected to an address terminal of the lower significance group of the corresponding store, addressing means connected to the terminals of the higher significance groups for cyclically addressing groups of storage locations, and discriminator means responsive to output signals from groups of output-store storage locations, when containing data and when addressed by way of the mapping means and by the addressing means during recognition, to provide a measure of recognition.

An advantage of the present invention is that a parallel/series structure is provided for the output stores which form the storage for the discriminators. In a totally parallel storage structure such as is shown in the above mentioned paper a large number of discrete stores each with individual wiring are required and in a totally series storage structure where there is one bus-addressed store for use by all discriminators, times for recognition are comparatively long. The present arrangement allows structures between the totally parallel and totally serial so making possible an optimum arrangement for a particular application.

Each output store may be a single integrated-circuit but is usually a board carrying a number of such circuits. If the apparatus is to be able to carry out both learning and recognition the integrated circuits are conveniently random access memories (RAMs) but if only the recognition phase is to be carried out the integrated circuits may be read only memories (ROMs). Each integrated circuit may store either a bit or a byte at each storage location.

The mapping means may include means for generating a series of addresses for the input store and addressing the input store with the addresses generated, and a register for storing successive sequences of bits from the input store, the said output terminals of the mapping means being output terminals of respective stages of the register.

Each output store has at least one output terminal at which a signal appears corresponding to the contents of a location in that store which is addressed, and the discriminator means may include one response means for, and connected to, each said output-store output terminal, and operating means for receiving signals from the response means, and clearing the response means, at the end of each cycle of the addressing means and operating upon the signals so received and any previously received signals relating to the same image in providing the measure of recognition.

Apparatus according to the invention may include write means for storing data in the output stores when during a learning phase data corresponding to an image is present in the input store, the addressing means being constructed to generate at least one change-image signal in each cycle, each such signal being generated after a group of output stores has been addressed, and indicating that a change of image is required in the learning phase.

Each output store may have a number of write terminals equal to the number of bits which can be stored at each location, the application of a predetermined signal to a write terminal allowing one state of a binary signal to be stored at a location addressed at the same time. The apparatus may then include means for sequentially applying the said predetermined signal to groups of the said write terminals, each group containing corresponding write terminals of every output store, and means for generating a change-image signal each time the said predetermined signal is applied to a different group of the said write terminals.

By using the apparatus in both learning and recognition phases with a type of pattern to be recognised and varying both the mapping and the N-tuple size it is possible to find a combination of these variables which provides improved recognition.

Preferably the means for mapping includes a random or pseudo random generator to determine the mapping. Having once determined the mapping, the mapping means preserves this mapping during learning and recognition relating to one pattern or type of pattern but different mappings may be used in order to determine which mapping is useful for a particular class of pattern.

Certain embodiments of the invention will now be described by way of example with reference to the accompanying drawings, in which.

Figure 1:
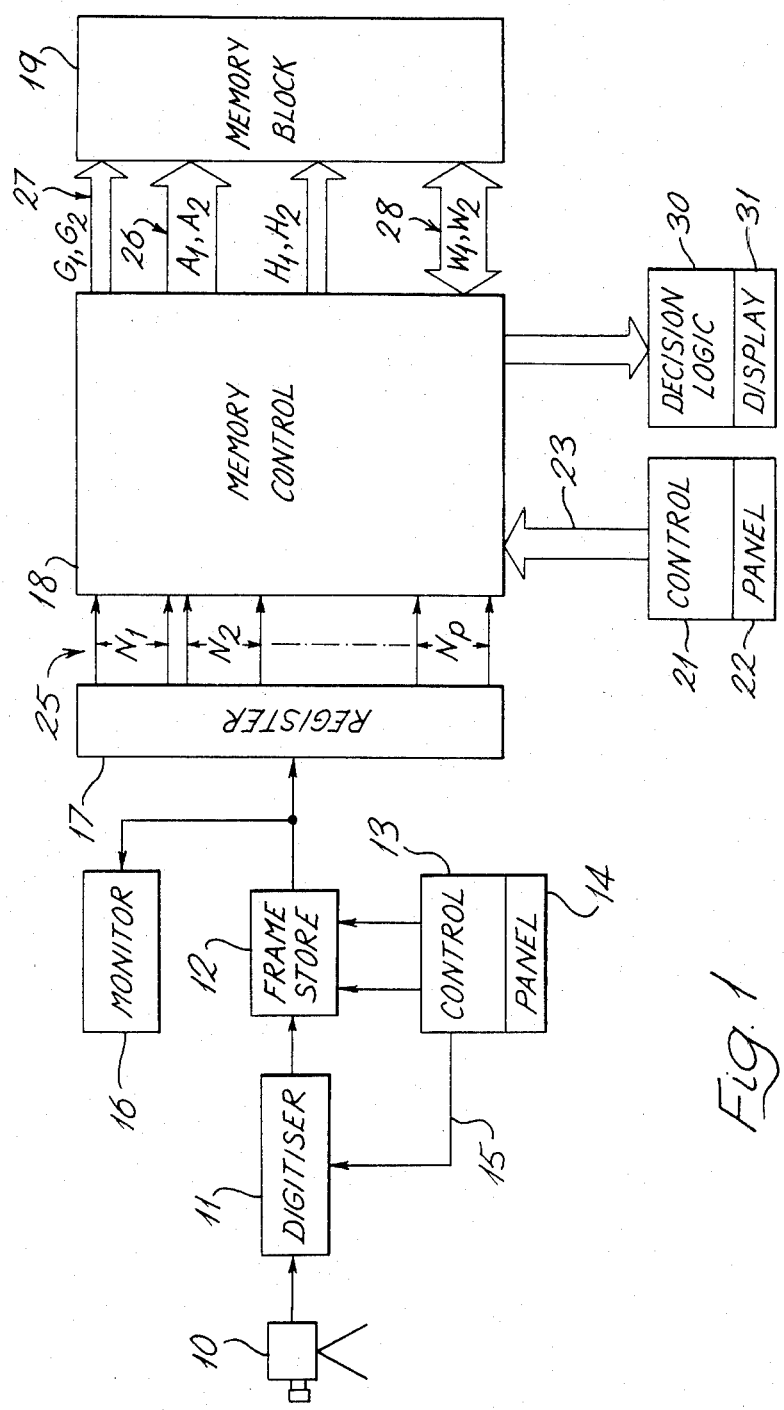
FIG. 1 is a block diagram including apparatus according to the invention.

In FIG. 1 patterns for learning or recognition are viewed by a television camera 10, the output of which is converted to digital form in a digitiser circuit 11 and stored in an input store in the form of a frame store 12. The frame store and digitiser circuit are under the control of a circuit 13 having a user control panel 14. The camera of course, allows an area of the pattern which is to be recognised to be selected and the camera controls allow the magnification of the pattern to be adjusted. Controls of the circuit 13 enable a "window" (that is a selected area of camera output) to be set up for storage in the frame store 12. A picture corresponding to the contents of the frame store 12 is displayed on the monitor 16 to enable the operator to see the part of the pattern which has been selected by the camera and the use of the controls. Since the above described part of FIG. 1 uses known equipment it is not described further.

The contents of the frame store 12 are read out to a register 17 in which the data are marshalled. As is explained below read-out is carried out according to a predetermined mapping between the frame store 12 and the register 17. Mapping may be, for example. pseudo random, linear, or special purpose and is controlled by the circuit 13. If selectable mapping is provided it may be under the control of a panel 14.

The contents of the register 17 are transferred by way of a memory control circuit 18 a plurality of output stores in the form of a set of RAM memory elements in a block 19.

An optional control circuit 21 and operator's control panel 22 may be used to set up the memory control circuit 18 by way of a channel 23.

In FIG. 1 the contents of the register 17 can be regarded as divided according to the selected N-tuples as indicated at 25 by the designations $N_1, N_2 \ldots N_p$. The selection of memory locations in the block 19 is according to the selected N-tuples and is effected by way of a channel 26 where groups of address lines are indicated as $A_1, A_2 \ldots$.

In the learning phase device select terminals 27 ($G_1$, $G_2 \ldots$) and write-enable terminals ($H_1, H_2 \ldots$) are activated by the control circuit 18 so that as each pattern is presented to the TV camera 10 the N-tuples of a respective discriminator block in the block 19 are activated and storage locations in respective N-tuples are written with binary ones in accordance with the addresses presented from the pattern by way of the mapping. Writing is carried out in a conventional manner using input/output lines 28 ($W_1, W_2 \ldots$). In this way each discriminator learns one pattern presented.

In the recognition phase the mapping between the register 17 and the N-tuples in the block 19 is the same as in the learning phase but now the RAM write-enable lines are not activated and responses corresponding to the contents of the storage locations in the block 19, making up the discriminators, are passed by way of the input/output lines 28 to the control circuit 18 where they are decoded according to discriminators and applied by way of a channel 24 to decision logic 30 which records the responses of each discriminator and provides signals for a display panel 31. Such responses may simply be the total number of binary ones read out of the N-tuples making up a discriminator when a pattern is presented to the camera 10 and the display may indicate the pattern with which the discriminator with the highest response was trained.

Figure 2:
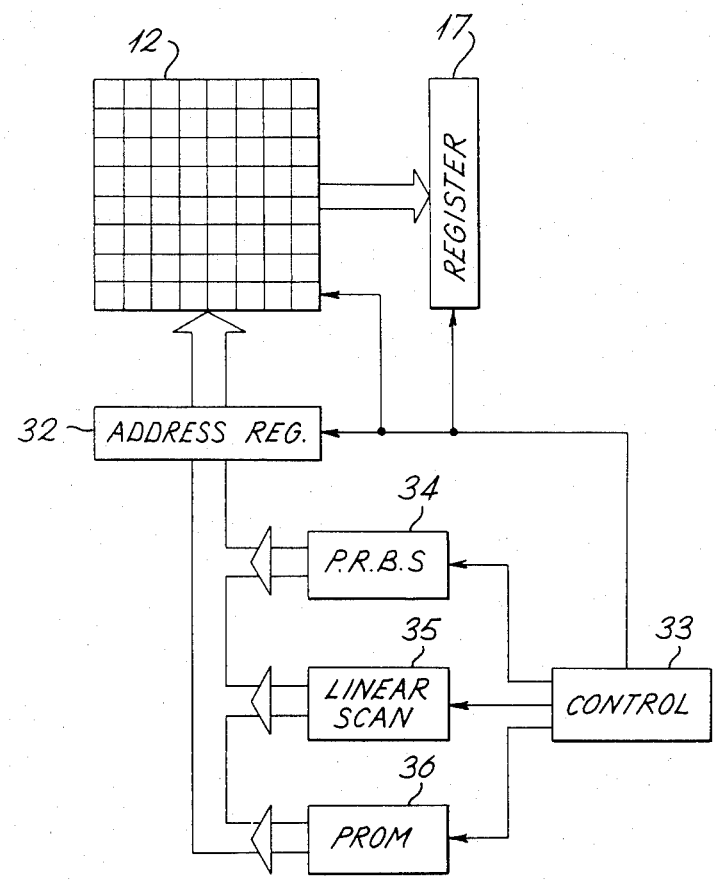
FIG. 2 is a block diagram of part of the control circuit 13 of FIG. 1.

Mapping control will now be described in more detail with reference to FIG. 2. The frame store 12 will generally be of the type which stores, for example, eight grey levels for each picture element (pixel). Each of the bits representing a pixel has its own serial number and the store is addressed by entering the serial number of the required bit in an address register 32. Sequences of addresses cause bits to be shifted into the register 17 and when p N successive addresses have been read into the register 32, p N-tuples fill the register 17. Each N-tuple is thus made up as required of a selection of bits governed by the sequence of addresses used. Mapping between the frame store 12 and the register 17 and transfer of data is under the control of a circuit 33 which may itself be controlled from the panel 14. A number of different mapping schemes may be adopted and circuits for three schemes are shown in FIG. 2:

- a pseudo random binary sequence (P.R.B.S.) generator 34 (such generators are known),
- a linear scan generator 35, and
- a programmable ROM containing the addresses of special purpose mappings.

Additional mapping schemes may be provided but in a system for carrying out recognition only a single ROM equivalent to the programmable ROM 36 is usually provided. It will be clear that if, for example, P.R.B.S.s are to be used then the control circuit 33 will enable the generator 34 and provide clock pulses to read bytes one at a time from the sequence into the address register 32 where the appropriate bits will be addressed in turn. Instead the linear scan generator 35 may be actuated, when each bit is read out in turn along a row or a column or the equivalent of a diagonal in a frame store 12. Equally if special purpose mapping is required words are read from the programmable ROM 36 in sequence under the control of the circuit 33 into the register 32.

A P.R.B.S. generator provides sequences in response to a "seed" (a number passed to the generator) and each time the same seed is used the same sequence is generated. Since once a mapping has been chosen it is used for training all discriminators for a set of images and must be used for recognition dependant on that training, the control circuit 33 is constructed to store "seeds" and pass them to the generator 34 as required.

Where it is required to change the size of N-tuples, the register 17 may simply be regarded as being divided into a different number of sections, although as will be explained arrangements for dealing with the output connections from the register 17 are changed. It may sometimes be desirable to change the mapping when the size of N-tuple is changed and this can be carried out, for example, by changing the programmable ROM 36 or its contents.

In another mapping arrangement the frame store 12 can be regarded as an array of storage locations in which each location has a rectangular coordinate address comprising an X coordinate and a y coordinate. These addresses are under the control of a mapping control circuit which is part of the control circuit 13. The output of the mapping control circuit is then in the form of a sequence of X and Y addresses passed to decode circuits.

The block 19 which will now be described in more detail with reference to FIG. 3 comprises p RAMs of which three 41, 42 and 43 are shown. Each RAM takes the form of a board carrying a number of RAM integrated circuits. Alternatively a single integrated circuit may be used instead of each board and its attached integrated circuits. Each board has A address terminals (shown on the face 44 of the RAM 41) which enable every location in the RAMs on the board to be addressed. The address terminals of each board are divided into three groups: a first group which is connected to a respective group of locations corresponding to an N-tuple in the register 17, a group of wires 47 (E) for selecting an N-tuple in the learning or recognition phase and a group of wires 48 (F) for selecting discriminators.

Figure 3:
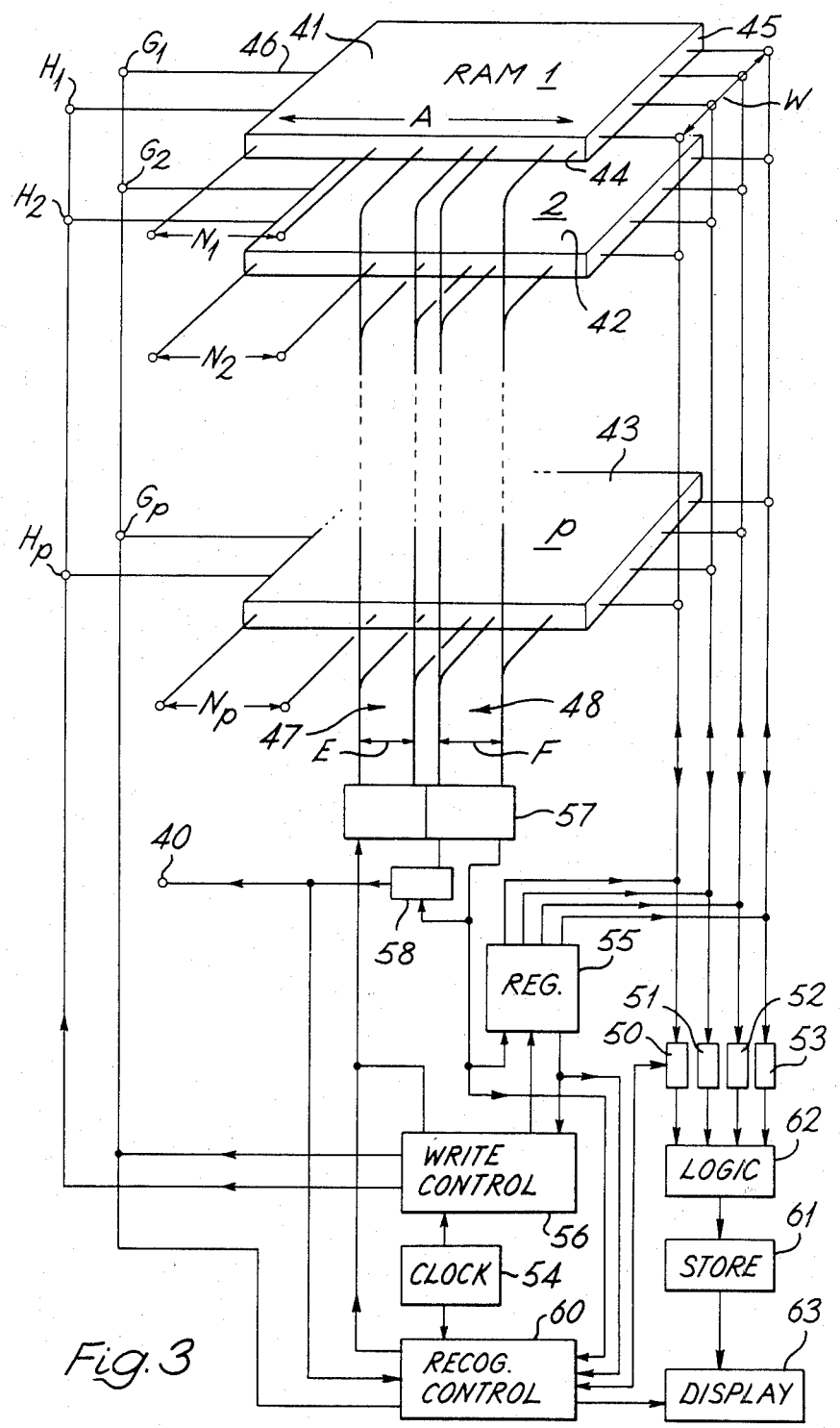
FIG. 3 is a block diagram of the set of RAM elements 19 of FIG. 1 and circuits for controlling the RAM elements.

In general each location is capable of storing a word comprising W bits but in FIG. 3 for ease of explanation W equals 4 and the input/output connections for the board 40 are shown on a face 45. Each input/output wire is connected to a respective one of four counters 50 to 53 which are used in discriminators and to the output terminals of a register 55 which is used in the learning phase.

The boards may instead have separate input and output wires and in this case the register 55 will be connected to the input wires and the counters 50 to 53 will be connected to the output wires.

Each of the p boards has a device enable terminal G and a write enable terminal H (G and H having suffixes relating to the board).

In the learning phase, the p stages of the register 17 apply signals determined by a teaching pattern at the camera 10 and thus an image held in the frame store 12 to the address terminals of the boards in $N_1$ to $N_p$ respective N-tuples.

Write control logic 56 is then used to reset the register 55, to set a counter 57 to zero, to enable all the device select terminals G and all the write-enable terminals H of the boards, and to prepare to pass clock pulses from a clock pulse generator 54 to the counter 57. The stages of lower significance E of the counter 57 are connected to the wires 47 and the higher significance stages F are connected to the wires 48. One of the wires W receives a logical one from the register 55 and the counter 57 stands at zero. In this state one section of each RAM board is selected corresponding to the address in the counter 57 and RAM elements corresponding to the addresses applied at the terminals $N_1$ to $N_p$ are selected and written with a binary one by way of the wire selected by the register 55. In this way a first group of N-tuples corresponding to part of the first discriminator is written.

When the first clock pulse occurs the register 17 is loaded with another p N-tuples but the training pattern is not changed. The counter 57 is incremented by one so that another p locations in the RAM boards are addressed. By continuing this process $2^E \times p$ N-tuples are written to correspond to the first discriminator but when the section E of the register 57 overflows as indicated by a pulse at a terminal 40 from a monostable circuit 58, a new pattern is presented to the camera 10 and while the $2^E$ states of the least significant end of the counter 57 are cycled the N-tuples of the second discriminator are written.

This process continues until $2^F$ discriminators have been written when an overflow from the most significant end of the counter 57 causes the shift register to activate the next of the input/output wires W. At this stage the monostable 58 again produces a pulse to indicate that a new pattern should be presented to the camera 10. The process continues until each stage of the register 55 has been marked in turn, and then a signal is sent to the write control circuit 56 to indicate that all discriminators have been written. By this time the N-tuples corresponding to $2^E \times W$ discriminators have been written using the same number of teaching patterns, and the apparatus is ready for the recognition phase.

Some learning procedures require the register 55 to mark two of the wires W at the same time, for example where an image presented contains two patterns, each corresponding to a different discriminator. Means for entering specific arrangements of bits into the register 55 may therefore be provided.

In the recognition phase the pattern to be recognised is presented to the camera 10 and the discriminators are all cycled and their responses compared. The discriminator which, for example, provides the highest response to the pattern presented is indicated and by correlating this discriminator with the corresponding pattern (that is the pattern presented to this discriminator during the learning phase), the pattern currently presented is recognised as being most nearly like the said corresponding pattern. Other recognition schemes may be used, for example the discriminators may be used to provide a not recognised signal if a certain minimum response is not achieved or if two discriminators give the same response. Various schemes for providing recognition signals from discriminator responses are known.

A recognition control circuit 60 is used in the recognition phase which first sets the counters 50 to 53 and 57 to zero and empties a store 61. In addition the device select terminals G of the RAM boards are enabled but the write enable terminals are not. Thus when addressed each RAM board outputs along the four wires W the byte stored at the location addressed. The first section (corresponding to p N-tuples) of the pattern to be recognised is now read from the frame store 12 into the register 17 addressing the terminals $N_1$ to $N_p$ of the RAM boards. Since the counter 57 is in its lowest state the first group of N-tuples corresponding to the four discriminators are addressed and where a binary one has been stored in the learning phase the counters 50 to 53 are incremented. Thus at this time the counters 50 to 53 correspond to the said four discriminators. The recognition control circuit 60 now passes a clock pulse to the counter 57 and at the same time the next p N-tuples of the pattern are loaded from the frame store 12 into the register 17. In this way the next group of N-tuples of each of the said four discriminators are addressed and the counters 50 to 53 are again incremented where binary ones were stored in the learning phase. A degree of recognition is thus indicated. The process continues until all the $2^E$ groups of p N-tuples of the pattern have been read into the register 17 and used to address the RAM boards. At this stage the section E of the counter 57 overflows and the monostable circuit 58 provides a pulse to the recognition control circuit 60 indicating that four discriminators have been cycled. The contents of the counters 50 to 53 are transferred to the logic circuit 62 where, in this example, their magnitudes are compared and then stored in a stack in the store 61 with the highest count and the corresponding discriminator number stored in the most significant position.

The recognition process described above is repeated until the section E of the counter 57 again overflows and the counters 50 to 53 are cleared when the logic 62 compares the contents of these counters with the contents of the store 61 to arrange the contents of the next four discriminators and the four previously stored in ascending order of magnitude. When the section F of the store 57 overflows it indicates that the recognition process is complete when after the last contents of the counters 50 to 53 have been transferred to the store 61, the discriminator number corresponding to the highest discriminator score is read into a display 63 indicating by correlation with a training pattern which of the training patterns is recognised as being most likely to be the same, or related to the pattern which is to be recognised.

If the apparatus is to be used only in the recognition phase the RAM memory comprising the p boards is replaced by a ROM memory, and the register 55 and the write control circuit 56 are omitted. Each of the p boards carries ROMs which have been set up to contain the same data as the corresponding RAMs in the arrangement described after the RAMs have experienced the learning phase. Thus the contents of the ROMs are specific to a particular set of teaching patterns and a particular mapping between the frame store 12 and the register 17.

The circuits 56 and 58 to 62 can conveniently be replaced by a microprocessor. If preferred the microprocessor can also provide a replacement for the counters 50 to 53 and 57, and the register 55.

The advantages of the parallel/serial memory structure of FIG. 3 are now apparent:
(a) there are $2^E \times N$ N-tuples although only p RAM boards are provided;
(b) in the recognition procedure, the number of passes to process one pattern to be recognised is $2^{E+F}$ instead of $2^A$ in an entirely serial arrangement; and
(c) the number of discriminators is $2^F \times W$.

Hence an optimum size of N-tuple and number of passes (equivalent to recognition time) can be achieved for many different applications using the parallel/series memory structure.

The control circuit 21 of FIG. 1 need only be provided in apparatus where it is required to vary the size of the N-tuples. For example N-tuple size can be increased by allocating one or more of the wires in the group E for this purpose. If for instance the N-tuple size is to be increased by two then two wires in the group E are so allocated and in each N-tuple from the register 17 two stages are gated to two of the wires in the group E while only one of the RAM boards receives a device enable signal. When the next N-tuple in the register 17 is processed two of its outputs are gated to the two wires of the group E and the device enable signal is applied only to the next RAM board. To obtain complete flexibility in the size of the N-tuples the number of wires in each of the groups $N_1$ to $N_p$ may be reduced to one.

When an optiaum parallel/series structure has been decided, for example for a particular application, further apparatus can be constructed in which the RAM boards are replaced by ROM boards (containing data provided as described above) and the register 55 and the write control circuit 56 are omitted.

The parallel/series memory structure lends itself to a modular approach which can easily be varied for different applications. A standard rack can be provided which will accommodate the maximum number of RAM or ROM boards required and the main items for individual construction are then the number of address wires A selected for direct connection to the register 17 and the number of wires for connection in the two groups E and F.

While a specific form of the invention has been described it will be realised that it can be put into practice in many other ways, for example the manual control panels 14 and 22 may be replaced by an interface for a computer, and the optical input can be in many forms and can be replaced by other forms of input such as a touch panel, a graphical input, and an audio transducer.

Uses envisaged for the invention include provision of a large number of recognition terminals in premises which require to recognise such items as credit cards, bank notes or people's faces or voices. Other uses include recognising parts in factory assembly operations and sorting such parts. Quality control of fruit and other products may be carried out by using the recognition apparatus to recognise satisfactory items.

We claim:
1. Apparatus for recognising images, comprising
an input store having a plurality of storage locations allowing data representative of elements of an image which is to be recognised to be stored at locations related to the positions of the elements,
a plurality of output stores each having a number of address terminals which allow every storage location in that store to be addressed, the locations of the output store either containing, or being capable of containing, data related to images which are to be recognised, the address terminals being divided into at least a lower significance group and a higher significance group, each group of terminals containing at least one terminal,
mapping means with input connected to the input store and a plurality of output terminals divided into groups with each group corresponding to a respective output store and at least one of the terminals of that group connected to an address terminal of the lower significance group of the corresponding store,
addressing means connected to the terminals of the higher significance groups for cyclically addressing groups of storage locations, and
discriminator means responsive to output signals from groups of output-store storage locations, when containing data and when addressed by way of the mapping means and by the addressing means during recognition, to provide a measure of recognition.

2. Apparatus according to claim 1 wherein each location of the input store is capable of storing a word of at least one bit and the mapping means includes
means for generating a series of addresses for the input store and addressing the input store with the addresses generated, and
a register for storing successive sequences of bits from the input store, the said output terminals of the mapping means being output terminals of respective stages of the register.

3. Apparatus according to claim 1 wherein all the mapping means output terminals of each group are connected to respective address terminals of the lower significance group of the corresponding output store.

4. Apparatus according to claim 1 wherein each output store has at least one output terminal at which a signal appears corresponding to the contents of a location in that store which is addressed, the output terminals of the output stores being in groups of corresponding terminals, and the discriminator means includes one response means for each group of output-store output terminals, and connected to the output terminals in that group, and operating means for receiving signals from the response means and clearing the response means, at the end of each cycle of the addressing means and operating upon the signals so received and any previously received signals relating to the same image in providing the measure of recognition.

5. Apparatus according to claim 4 wherein the addressing means is constructed to generate at least one read signal in each cycle, each such signal being generated after a group of output stores has been addressed, and the operating means is constructed to receive signals from the response means and clear the response means in response to each read signal, and to operate on the signals so received and any previously received signals relating to the same image in providing the measure of recognition.

6. Apparatus according to claim 4 wherein each response means totals the number of binary ones it receives before being cleared, and the operating means operates on the response received from each response means by comparing it with other responses.

7. Apparatus according to claim 1 including write means for storing data in the output stores when during a learning phase data corresponding to an image is present in the input store, the addressing means being constructed to generate at least one change-image signal in each cycle, each such signal being generated after a group of output stores has been addressed, and indicating that a change of image is required in the learning phase.

8. Apparatus according to claim 7 wherein each output store has a number of write terminals equal to the number of bits which can be stored at each location, the application of a predetermined signal to a write terminal allowing one state of a binary signal to be stored at a location addressed at the same time, and the apparatus includes means for sequentially applying the said predetermined signal to groups of the said write terminals, each group containing corresponding write terminals of every output store, and means for generating a change-image signal each time the said predetermined signal is applied to a different group of the said write terminals.

9. Apparatus according to claim 1 wherein the output stores comprise a plurality of read only memories.

10. Apparatus according to claim 1 comprising a video camera, means for digitising at least a portion of the signal from the camera and transferring the result to the input store.

* * * * *